No. 670,048. Patented Mar. 19, 1901.
M. G. BUNNELL.
VEHICLE WHEEL AND AXLE.
(Application filed July 5, 1899.)

(No Model.)

Witnesses:
A. F. Durand
Agnes A. Devine

Inventor:
Morton G. Bunnell,
by Chas. L. Page, Atty.

UNITED STATES PATENT OFFICE.

MORTON G. BUNNELL, OF CHICAGO, ILLINOIS, ASSIGNOR TO FREDERICK C. AUSTIN, OF SAME PLACE.

VEHICLE WHEEL AND AXLE.

SPECIFICATION forming part of Letters Patent No. 670,048, dated March 19, 1901.

Application filed July 5, 1899. Serial No. 722,796. (No model.)

*To all whom it may concern:*

Be it known that I, MORTON G. BUNNELL, a citizen of the United States, residing at Chicago, county of Cook, State of Illinois, have invented a certain new and useful Improvement in Vehicle Wheels and Axles, of which the following is a specification.

The objects of my invention are to provide an absolutely dust-proof bearing for vehicle-wheels, to provide a simple and an inexpensive construction, to reduce the cost of manufacture, to provide a spindle or axle which can be readily repaired when worn out, to prevent the lubricating-oil from leaking from the ends of the hub, to avoid threading the spindle or axle, to permit a ready and easy removal of the wheel from the spindle, and to provide certain details tending to render a device of this character serviceable and thoroughly reliable.

To the attainment of the foregoing and other useful ends I provide the axle or spindle with a removable wearing-sleeve and arrange the retaining-nut at the inner end of the hub. With this arrangement the said sleeve can be utilized as a shoulder to retain the wheel upon the spindle, and the outer end of the hub can be closed or made blind. The said retaining-nut can be adapted for connection with the hub in any suitable manner, but preferably by providing it with wedge-like or beveled portions adapted to engage suitable lugs or projections on the hub, and as a matter of further improvement the said nut can be chambered or recessed to provide a stuffing-box. In this way the bearing will not only be absolutely dust-proof, but will also be of a character to prevent leakage of the oil from the ends of the hub.

Other advantages and features of improvement will hereinafter more fully appear.

Figure 1:
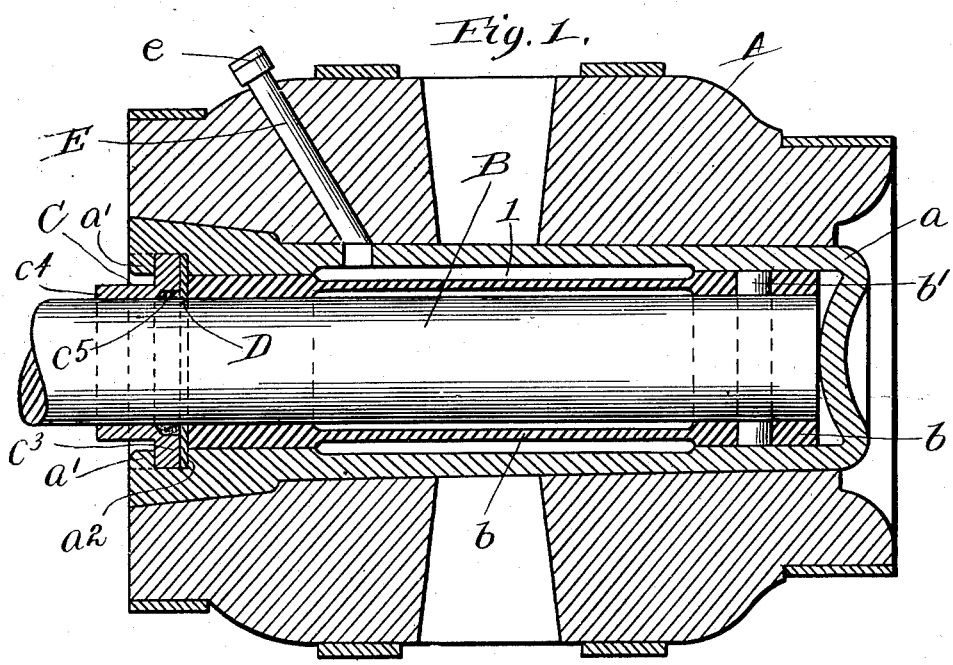
Figure 2:
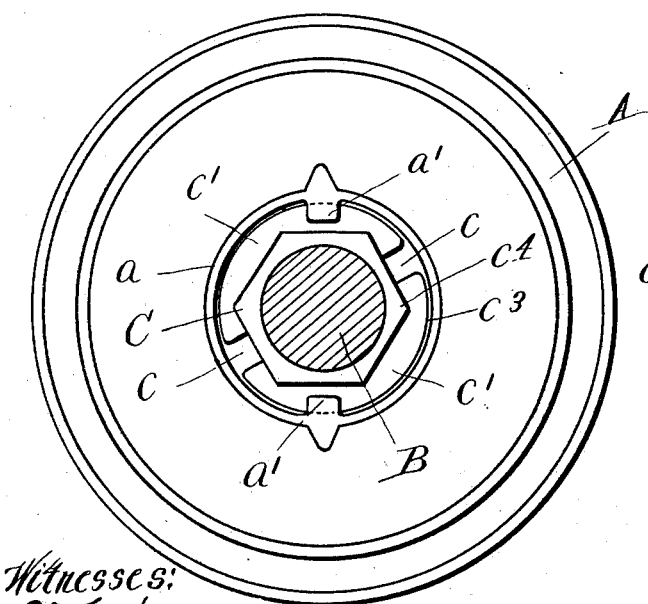
Figure 3:
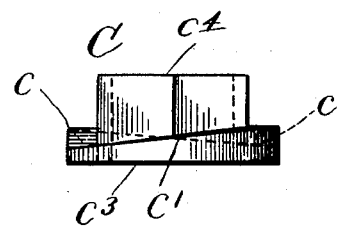

In the accompanying drawings, Figure 1 is a longitudinal section through a wheel hub and axle embodying the principles of my invention. Fig. 2 is a view of the inner end of the hub. Fig. 3 is a view of the retaining-nut.

My invention as thus illustrated comprises a wheel-hub A, a spindle B, and a retaining-nut C. The said hub may be constructed either wholly or in part of metal and is preferably provided with a box $a$, having its outer end closed or made blind. This blind or closed end of the hub-box may be internally rounded for the purpose of reducing friction between its inner surface and the end of the spindle, though it is of course obvious that a conic formation would effect a like result. The spindle or axle B can be either straight or tapered and is provided with a removable wearing-sleeve $b$. This sleeve may be made in either one or several pieces, but preferably one, and can be secured to the spindle by a transverse pin $b'$. Preferably the said sleeve is reduced or cut away both internally and externally at its middle portion, and the hub-box has its interior correspondingly chambered or recessed to provide an oil-chamber 1. With this arrangement it will be seen that the wheel will ride only upon the outer and inner end portions of the wearing-sleeve and that consequently there will be a minimum of friction between the wheel and spindle.

While the retaining-nut C may be adapted for engaging the hub in any suitable manner and can be of any ordinary form or pattern, I prefer, as a matter of special improvement, to provide the nut circumferentially with notches $c$ and also with beveled or wedge-like portions $c'$, and with reference to such formation of the nut I enlarge the inner end of the bore of the hub-box and provide the same with lugs $a'$. The notches in the flanged portion $c^3$ of the nut permit the latter to pass the lugs $a'$ and be brought to bear against the shoulder or offset $a^2$ of the hub-box, and by then applying a wrench to the polygonal portion $c^4$ of the nut the latter can be rotated to an extent to bring the notches out of register with the lugs, wedge the portions $c'$ between the lugs and the shoulder or offset $a^2$, and thus firmly lock the nut upon the inner end of the hub. It is also preferable to arrange a leather washer D between the nut and the offset or shoulder $a^2$, and as a matter of further and special improvement the inner end of the nut can be chambered or recessed to provide a stuffing-box $c^5$. When thus secured to the inner end of the hub, the nut will bear against the inner end of the wearing-sleeve $b$, and in this way it will be seen that the latter serves as a shoulder to retain the wheel upon the axle. The stuffing-box $c^5$, in conjunction with the closed outer end of the hub-box, will effectually prevent all leakage of oil from the bearing and will also render the same positively and absolutely dust-proof. The wearing-sleeve when worn out can be removed and replaced by a new one, as may also the hub-box, and the sleeve can also be readily removed for the purpose of permitting a removal of the retaining-nut. While a flange or collar on the spindle could be provided to serve as a shoulder for the nut, I prefer, as a matter of special improvement and with a view to obtaining simplicity and economy of manufacture, to utilize the inner end of the sleeve $b$ for such purpose and to adopt an arrangement substantially the same as that shown and described. As a means for permitting lubrication the hub can be provided with a duct E, leading to the chamber 1, and the outer end of such duct can be closed or covered by a removable cap $e$.

What I claim as my invention is—

1. The combination of a hub-box having its end rounded internally to bear against the end of the spindle, a removable wearing-sleeve arranged upon said spindle, and a retaining member removably secured to the inner end of the hub and arranged to bear against the inner end of said sleeve.

2. A vehicle-wheel, a spindle having a removable wearing-sleeve which is reduced externally at its middle portion and correspondingly chambered internally, and a hub-box having its interior recessed or chambered, substantially as described.

MORTON G. BUNNELL.

Witnesses:
ARTHUR F. DURAND,
AGNES A. DEVINE.